(12) United States Patent
Machino

(10) Patent No.: US 8,983,770 B2
(45) Date of Patent: Mar. 17, 2015

(54) NAVIGATION APPARATUS

(75) Inventor: Hiroshi Machino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1035 days.

(21) Appl. No.: 12/515,956

(22) PCT Filed: Oct. 15, 2007

(86) PCT No.: PCT/JP2007/070089
§ 371 (c)(1),
(2), (4) Date: May 22, 2009

(87) PCT Pub. No.: WO2008/084580
PCT Pub. Date: Jul. 17, 2008

(65) Prior Publication Data
US 2009/0326804 A1 Dec. 31, 2009

(30) Foreign Application Priority Data
Jan. 11, 2007 (JP) ................................. 2007-003668

(51) Int. Cl.
| G05D 1/00 | (2006.01) |
| G05D 1/06 | (2006.01) |
| G08G 1/09 | (2006.01) |
| G01C 21/34 | (2006.01) |
| G01C 21/36 | (2006.01) |
| G08G 1/0969 | (2006.01) |

(52) U.S. Cl.
CPC .......... *G08G 1/091* (2013.01); *G01C 21/3415* (2013.01); *G01C 21/3461* (2013.01); *G01C 21/3492* (2013.01); *G01C 21/3658* (2013.01); *G08G 1/0969* (2013.01)

USPC .......................................... 701/414; 701/409

(58) Field of Classification Search
None
See application file for complete search history.

(56) References Cited

U.S. PATENT DOCUMENTS

| 6,295,503 B1 | 9/2001 | Inoue et al. | |
| 6,401,027 B1 * | 6/2002 | Xu et al. | 701/117 |
| 6,434,482 B1 * | 8/2002 | Oshida et al. | 701/209 |
| 6,804,604 B2 * | 10/2004 | Yamazaki | 701/211 |

(Continued)

FOREIGN PATENT DOCUMENTS

| DE | 10 2004 032 194 A1 | 4/2005 |
| JP | 8-313291 A | 11/1996 |

(Continued)

*Primary Examiner* — Ryan Zeender
*Assistant Examiner* — Denisse Ortiz Roman
(74) *Attorney, Agent, or Firm* — Birch, Stewart, Kolasch & Birch, LLP (57) ABSTRACT

A navigation apparatus, including a map data acquiring means 11a, 11, 12, and 5 for acquiring map data including car pool lane data, a current position determining means 13, 14, 15, and 10 for determining a current position, and a display unit 2 for generating and displaying a map of an area in a neighborhood of the determined current position on the basis of the acquired map data, is provided with a road information receiving means 16 for receiving road information in real time from outside the apparatus, a control unit 10 for, when the road information received by the road information receiving means shows that a traffic congestion has occurred in a highway in a traveling direction, judging whether a car pool lane is also provided in the highway on the basis of the map data acquired by the map data acquiring means, and an output means 2 and 4 for outputting a message showing whether or not there exists a car pool lane according to the result of the judgment by the control unit.

6 Claims, 6 Drawing Sheets

(56) References Cited

U.S. PATENT DOCUMENTS

| | | | |
|---|---|---|---|
| 7,912,627 B2 * | 3/2011 | Downs et al. | 701/117 |
| 8,024,115 B2 * | 9/2011 | Hayashida et al. | 701/414 |
| 2001/0021895 A1 | 9/2001 | Yamazaki | |
| 2004/0181495 A1 | 9/2004 | Grush | |
| 2004/0260455 A1 | 12/2004 | Dort | |
| 2005/0055158 A1 | 3/2005 | Machino | |
| 2005/0071080 A1 | 3/2005 | Sano | |
| 2008/0208448 A1 * | 8/2008 | Geelen et al. | 701/201 |

FOREIGN PATENT DOCUMENTS

| | | |
|---|---|---|
| JP | 2000-131085 A | 5/2000 |
| JP | 2001-183159 A | 7/2001 |
| JP | 2002-250635 A | 9/2002 |
| JP | 2005-61988 A | 3/2005 |
| JP | 2005-83758 A | 3/2005 |
| JP | 2006-133068 A | 5/2006 |
| JP | 2006-145481 A | 6/2006 |
| JP | 2006-300771 A | 11/2006 |
| JP | 2006-300903 A | 11/2006 |

* cited by examiner

NAVIGATION APPARATUS

FIELD OF THE INVENTION

The present invention relates to a navigation apparatus which is mounted in a vehicle and which presents information about a car pool lane disposed on a highway, an expressway, or the like (simply referred to as a "highway" from here on) which exists in the traveling direction of the vehicle. More particularly, it relates to a technology of presenting appropriate information according to the presence or absence of traffic congestions in a highway.

BACKGROUND OF THE INVENTION

A conventional navigation apparatus displays the current position of a vehicle which is determined by a vehicle position calculating unit on a digital map (simply referred to as a "map" from here on) displayed on a display unit while superimposing the current position on the map. Furthermore, the conventional navigation apparatus searches for a recommended route from the current position of the vehicle which is determined by the vehicle position calculating unit to a destination inputted via an input unit, and displays the recommended route on the map. The conventional navigation apparatus then carries out a route guidance about the recommended route on the basis of the shapes of road links read from a recording medium.

By the way, as controlled-access roads, there exist not only a road in which travel of all the vehicles is restricted, but also a road in where travel of vehicles is restricted according to the conditions of the vehicles. For example, a car pool lane (Car Pool Lane) which is adopted by a road system mainly seen in big cities of North American is an example. A car pool lane is also called an HOV lane (High Occupancy Vehicle Lane), and is a lane along which, for example, only vehicles in each of which two or more persons are riding are granted to travel. For example, a lane which is also provided on a highway, a lane which is a shortcut of an interchange, and so on are known as car pool lanes. A road system which adopts such a car pool lane provides users with a preferential treatment that makes it possible to arrive at the destination in a shorter time as long as they travel along a car pool lane so as to prod users to share a vehicle with one or more persons, thereby reducing the traffic as a whole and therefore reducing traffic congestions.

As a technology relevant to such a car pool lane, patent reference 1 discloses a routing apparatus which implements more appropriate routing by supporting a case in which whether a vehicle can travel a car pool lane varies according to the conditions of the vehicle. This routing apparatus sets up a route to a destination in consideration of vehicle related information. For example, when the vehicle is occupied by one passenger or less, the routing apparatus handles car pool lanes as lanes along which the vehicle cannot travel and does not define them as a target for route determination, whereas when the vehicle is occupied by two or more passengers, the routing apparatus handles car pool lanes in the same way that the routing apparatus handles other roads, and defines them as a target for route determination. Therefore, when the vehicle is occupied by two or more passengers, the routing apparatus may set up a more advantageous route to the destination by including car pool lanes into the route, compared with a case in which it does not include any car pool lane into the route. Because in many cases car pool lanes are more advantageous than general purpose lanes, for example, car pool lanes are closer to exits and the traveled distance over which the vehicle travels along the route is reduced in the case of using car pool lanes, it can be expected that the route to the destination including car pool lanes becomes more appropriate.

Patent reference 2 discloses a navigation apparatus which enables a vehicle to efficiently travel along a lane from which the vehicle is restricted from exiting and then entering another lane and which the vehicle is restricted from entering from another lane. This navigation apparatus reads map data including road information about entering and exiting points in a highway provided with car pool lanes from a DVD, and stores them in a data buffer. A route search processing unit performs a route searching process in consideration of whether or not car pool lanes can be used by using the map data stored in the data buffer. When performing a route guidance using car pool lanes, a car pool lane guidance unit performs a predetermined lane change guidance using an image and voice at a time when each of the entering and exiting points at which the vehicle should change its traveling direction moves close to a point at a predetermined distance or less from the position of the vehicle.

Furthermore, patent reference 3 discloses a vehicle-mounted navigation apparatus which searches for a recommended route in consideration of the number of passengers. This vehicle-mounted navigation apparatus has a storage unit for storing map data including link data about each link which constructs a road on a map. As for a car pool link on which restrictions of prohibiting a vehicle which are not occupied by two or more persons from traveling are imposed, the vehicle-mounted navigation apparatus uses link data including information showing that such restrictions are imposed on the car pool link to search for a recommended route from the place of departure to the destination. Furthermore, when a car pool link is included in a constitution link which constructs the recommended route, the vehicle-mounted navigation apparatus receives an input of the number of passengers, and searches for a recommended route from the place of departure to the destination by using the link data to exclude links along which the vehicle cannot travel because the received number of passengers does not meet a certain criterion.

[Patent reference 1] JP, 2000-131085, A
[Patent reference 2] JP, 2001-183159, A
[Patent reference 3] JP, 2005-061988, A In many cases, a car pool lane currently provided is disposed as a central one of a plurality of lanes of a highway. A problem is therefore that when a vehicle enters a highway from a local street via an entrance of the highway or a connection road to the highway and then enters a car pool lane from an ordinary driving lane of the highway, the vehicle must cross a plurality of driving lanes of the highway until entering the car pool lane, and this entails danger to the user of the vehicle and forces the user to do a burdensome driving operation when many vehicles are traveling along the highway at a high speed and when a traffic congestion has occurred. Furthermore, because the number of vehicles which are traveling along a highway at a high speed changes greatly depending on what day of the week it is or what time zone it is, and low-acceleration vehicles and large-sized vehicles also travel along a highway, it is dangerous to cross a plurality of driving lanes during travel over a short distance. This problem similarly arises in a case in which a vehicle goes out of a car pool lane to a highway via an exit of the car pool lane, crosses an ordinary driving of the highway, and then goes out of the highway to a local street via an exit or a connection road of the highway.

However, no measures against the above-mentioned problem are taken in the route search of conventional navigation apparatuses, and conventional navigation apparatuses simply perform a search for a route including a car pool lane as a part thereof. Therefore, the problem that when a vehicle uses a car pool lane, that is, when a vehicle enters a car pool lane from a local street via ordinary driving lanes of a highway, and then goes out of the car pool lane to a local street via ordinary driving lanes of the highway, the vehicle has to cross a plurality of driving lanes of the highway, and this entails danger to the user of the vehicle and also forces the user to do a burdensome driving operation is left behind.

By the way, when a highway along which the vehicle is traveling is vacant, the user does not need to take the trouble to drive along a car pool lane having the above-mentioned problem. Furthermore, because fluctuations in the number of vehicles which are traveling along driving lanes at a high speed are large depending on dates, days of week, or a time zone, a navigation apparatus which can determine whether or not a vehicle can travel along a car pool lane according to the traffic congestion state of a highway is required. Furthermore, a navigation apparatus which can grasp points where a traffic congestion has occurred and whether or not there exists a car pool lane in real time is required.

The present invention is made to solve the above-mentioned problem and to meet the requirements, and it is therefore an object of the present invention to provide a navigation apparatus which can present appropriate information about car pool lanes to the user.

DISCLOSURE OF THE INVENTION

In order to solve the aforementioned problem, in accordance with the present invention, there is provided a navigation apparatus having a map data acquiring means for acquiring map data including car pool lane data, a current position determining means for determining a current position, and a display unit for generating and displaying a map of an area in a neighborhood of the current position determined by the current position determining means on a basis of the map data acquired by the map data acquiring means, the navigation apparatus further including: a road information receiving means for receiving road information in real time from outside the navigation apparatus; a control unit for, when the road information received by the road information receiving means shows that a traffic congestion has occurred in a highway in a traveling direction, judging whether a car pool lane is also provided in the highway on a basis of the map data acquired by the map data acquiring means; and an output means for outputting a message showing whether or not there exists a car pool lane according to a result of the judgment by the control unit.

The navigation apparatus in accordance with the present invention is constructed in such a way as to, when, regardless of whether the vehicle travels along the route acquired through the route search, the road information received in real time by the road information receiving means shows that a traffic congestion point exists forwardly in the traveling direction of the vehicle along a highway, judge whether a car pool lane is also provided in the highway, and output a message indicating the presence or absence of a car pool lane according to the judgment result. Therefore, the navigation apparatus in accordance with the present invention can present appropriate information about a car pool lane to the user. As a result, the user can acquire the information about a car pool lane before the vehicle enters the car pool lane or at an earlier time than when the user will recognize the indicator of the car pool lane visually. Therefore, when the highway along which the vehicle is traveling is vacant, the user does not need to take the trouble to use a car pool lane by running the risk of performing a lane changing. As a result, the user can do safe driving more quickly while keeping calm.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
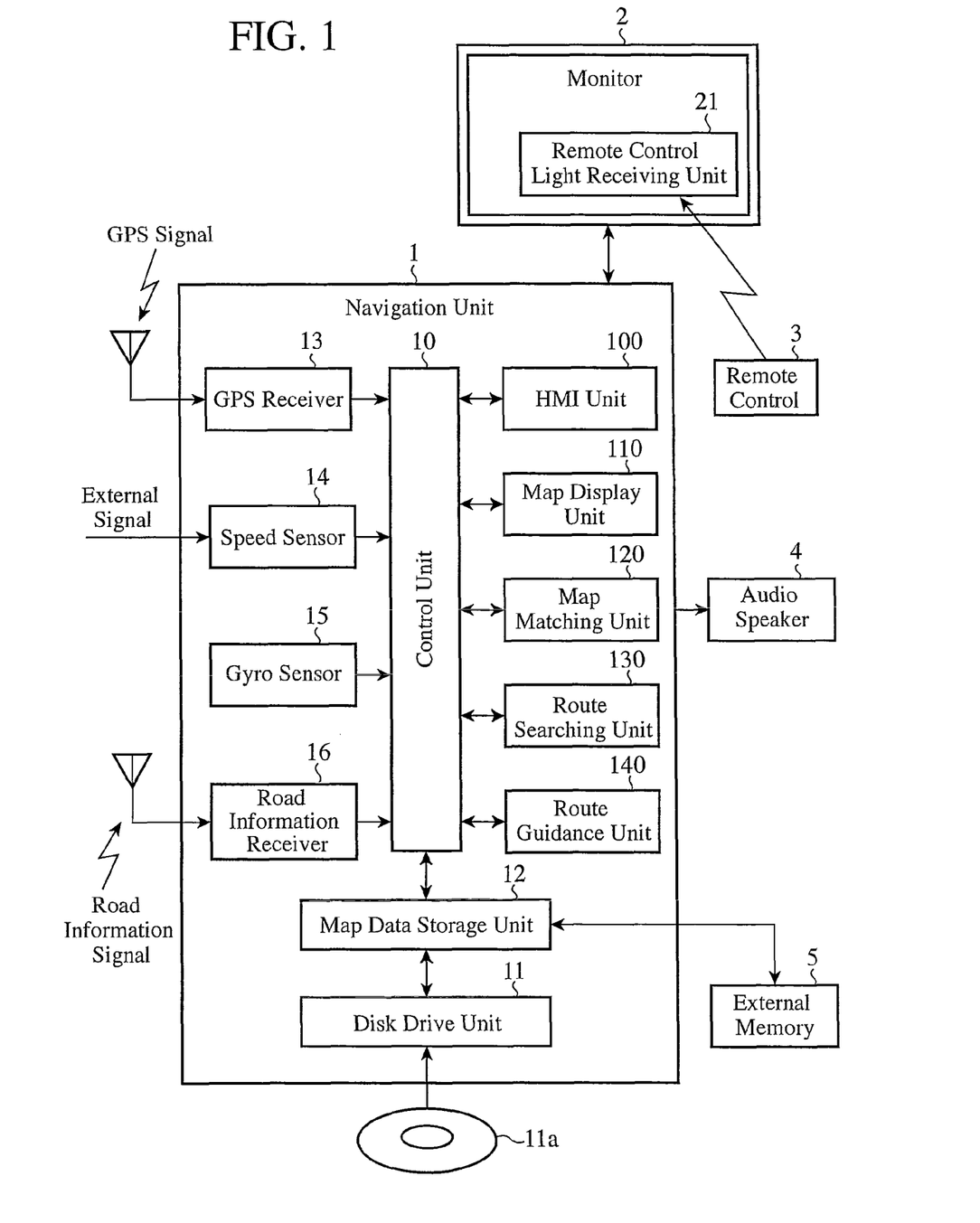
FIG. 1 is a block diagram showing the structure of a navigation apparatus in accordance with Embodiment 1 of the present invention.

FIG. 1 is a block diagram showing the structure of a navigation apparatus in accordance with Embodiment 1 of the present invention. This navigation apparatus is comprised of a navigation unit 1, a monitor 2, a remote controller (abbreviated as a "remote control" from here on) 3, an audio speaker 4, and an external memory 5.

The navigation unit 1 forms the heart of the navigation apparatus, and carries out processes, such as a map display, a route search, a route display, and a route guidance. Especially, an output (a display and an output by voice) of information about whether or not there exists a car pool lane and information about traffic congestions, which is a feature of the present invention, is also performed though control by this navigation unit 1. The details of this navigation unit 1 will be mentioned below.

The monitor 2 corresponds to a display unit and an output means in accordance with the present invention. The monitor 2 is comprised of, for example, an LCD (Liquid Crystal Display), and displays a map, a vehicle position mark, guidance information about a route to a destination, and various other messages according to display data sent thereto from the navigation unit 1. A remote control light receiving unit 21 is disposed in this monitor 2. The remote control light receiving unit 21 receives a light signal sent thereto from the remote control 3, and sends the light signal to the navigation unit 1 via the monitor 2.

The remote control 3 corresponds to an input unit in accordance with the present invention, and is used by the user to scroll a map, and to answer a message for urging the user to do a certain operation which is outputted from the monitor 2 or the audio speaker 4. Instead of the remote control 3 or together with the remote control 3, a touch panel can be disposed for enabling the user to directly touch a touch sensor mounted on the screen of the monitor 2 to input various pieces of information.

The audio speaker 4 corresponds to the output means in accordance with the present invention, and outputs, by voice, a route guidance message including a guidance about car pool lanes according to audio data sent thereto from the navigation unit 1. The external memory 5 is optional, and is comprised of, for example, an HDD (Hard Disk Drive). Map data which are similar to map data stored in a recording medium 11a inserted into a disk drive unit 11 which will be mentioned below and including car pool lane data are stored in this external memory 5.

Next, the details of the navigation unit 1 will be explained. The navigation unit 1 is comprised of a control unit 10, the disk drive unit 11, a map data storage unit 12, a GPS (Global Positioning System) receiver 13, a speed sensor 14, a gyro sensor 15, a road information receiver 16, a human-machine interface (abbreviated as an "HMI" from here on) unit 100, a map display unit 110, a map matching unit 120, a route searching unit 130, and a route guidance unit 140.

The control unit 10 is comprised of, for example, a microcomputer, and controls the whole of this navigation unit 1. The HMI unit 100, the map display unit 110, the map matching unit 120, the route searching unit 130, and the route guidance unit 140 is comprised of an application program which operates under the control of this microcomputer.

When the recording medium 11a, such as a DVD (Digital Versatile Disc) or a CD (Compact Disc), in which a map database including map data is stored is inserted thereinto, the disk drive unit 11 plays back a content recorded in the recording medium. The map data are defined by nodes, road links, etc., and include link information, such as intersection construction links, destination area data, car pool lane data, and road number data. The map data played back by this disk drive unit 11 are sent to the map data storage unit 12.

Car pool lane data include lane information (the position of a car pool lane in all lanes), information about the types of vehicles which can use the car pool lane (e.g., a general vehicle, a bus, a truck, an emergency vehicle, a hybrid vehicle, a motorcycle, and so on), information about the number of passengers which is required of the user to use the car pool lane, information about dates or days of the week on which vehicles can use the car pool lane, and a time zone in which vehicles can use the car pool lane, information about the toll fee of using the car pool lane, etc.

The map data storage unit 12 temporarily stores the map data sent thereto from the disk drive unit 11 or the external memory 5. A map data acquiring means in accordance with the present invention is comprised of either the disk drive unit 11 to which the recording medium 11a is mounted, or the external memory 5, and the map data storage unit 12. The map data stored in this map data storage unit 12 are used for display of information about a car pool lane, which will be mentioned below, a map, roads, various icons, other information, etc., and are also used for a route search and a route guidance.

The GPS receiver 13 detects the current position of the vehicle on the basis of GPS signals from GPS satellites which are received via an antenna. Current position data showing the current position of the vehicle detected by this GPS receiver 13 are sent to the control unit 10. The speed sensor 14 detects the traveling speed of the vehicle on the basis of an external signal sent from the vehicle in which this navigation apparatus is mounted. Speed data showing the traveling speed of the vehicle detected by this speed sensor 14 are sent to the control unit 10.

The gyro sensor 15 detects the traveling direction of the vehicle. Direction data showing the traveling direction of the vehicle detected by this gyro sensor 15 are sent to the control unit 10. The control unit 10 detects the current position of the vehicle with autonomous navigation on the basis of the speed data sent thereto from the speed sensor 14 and the direction data sent thereto from the gyro sensor 15. Because the navigation apparatus can detect the current position of the vehicle with autonomous navigation even if the navigation apparatus cannot detect the current position of the vehicle using the GPS receiver 13 when, for example, the vehicle is traveling through a tunnel, the navigation apparatus can always detect the current position of the vehicle correctly. A current position determining means in accordance with the present invention is comprised of the GPS receiver 13, the speed sensor 14, the gyro sensor 15, and the control unit 10 which processes data sent from these components.

The road information receiver 16 receives a road information signal transmitted thereto from, for example, an external road traffic data communications system. As the road traffic data communications system, for example, a TMC (Traffic-Message Channel), a VICS (Vehicle Information and Communication System), a satellite (satellite communications) system, or the like can be used. This road information signal received by the road information receiver 16 is sent, as road information, to the control unit 10. The control unit 10 generates a message showing congestion information about congestions on roads on the basis of the road information received from the road information receiver 16, and notifies the message to the user via the monitor 2 and the audio speaker 4.

Under the control of the control unit 10, the HMI unit 100 processes either a command which is generated when the user manipulates a not-shown control panel or a command sent thereto from the remote control 3 via the monitor 2 including the remote control light receiving unit 21. This HMI unit 100 carries out communications between the navigation apparatus and the user.

The map display unit 110 generates drawing data for making the monitor 2 display a map, an intersection guidance figure, information about a car pool lane, a telop for notifying various pieces of information to the user, or the like under the control of the control unit 10. The drawing data generated by this map display unit 110 are sent to the monitor 2, so that a map, a intersection guidance figure, information about a car pool lane, a telop, or the like is displayed on the screen of the monitor 2.

Under the control of the control unit 10, the map matching unit 120 associates the position of the vehicle which is generated on the basis of either the current position data from the GPS receiver 13 or the current position data generated from the speed data sent thereto from the speed sensor 14 and the direction data sent thereto from the gyro sensor 15 with the map shown by the map data read from the map data storage unit 12 so as to form a vehicle position mark on the map.

Under the control of the control unit 10, the route searching unit 130 searches for a route from the current position of the vehicle to the destination which the user has set up by using the remote control 3 according to search conditions which the user has set up by using the remote control 3. This route searching unit 130 can perform both a search for a route with car pool lanes being made usable and a search for a route with car pool lanes being made unusable.

Regardless of whether the vehicle travels along a route acquired through the route search performed by the route searching unit 130, the route guidance unit 140 generates a guidance figure and a voice guidance message including information about a car pool lane as the vehicle travels. The guidance figure is displayed on the monitor 2, and the voice guidance message is outputted from the audio speaker 4.

Next, the operation of the navigation apparatus constructed as mentioned above will be explained. After performing a search for a route, when the vehicle travels along the route acquired through this route search, the navigation apparatus in accordance with this Embodiment 1 outputs congestion information showing whether a traffic congestion point exists on the route, and car pool lane presence or absence information showing whether or not a car pool lane is disposed forwardly in the traveling direction of the vehicle along the route.

Figure 2:
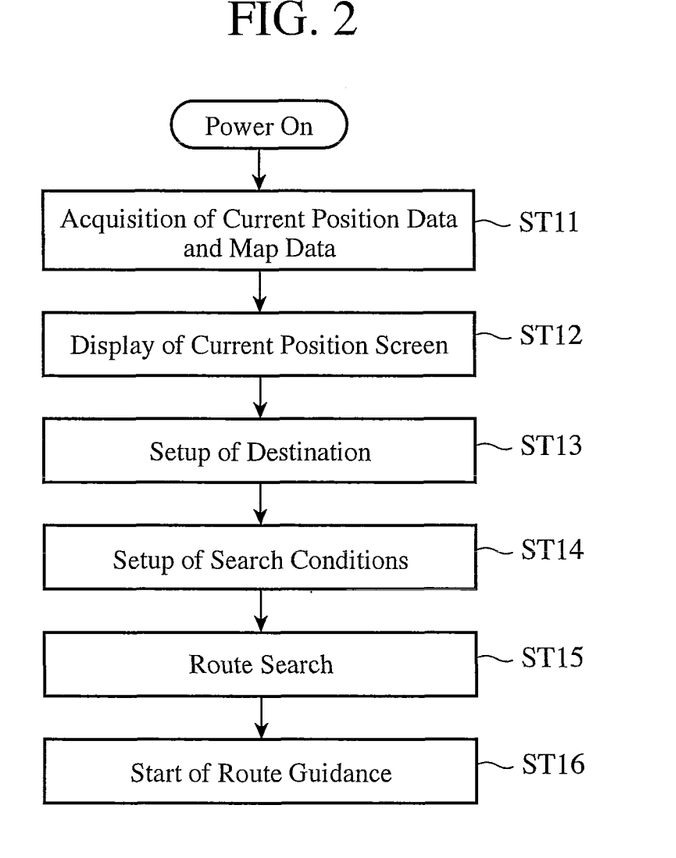
FIG. 2 is a flow chart showing a general route search process which is performed by the navigation apparatus in accordance with Embodiment 1 of the present invention.

First, a general route search process will be explained with reference to a flow chart shown in FIG. 2. When the power supply of the navigation apparatus is switched on, the navigation apparatus acquires the current position data and map data first (step ST11). More specifically, the control unit 10 sends either the current position data acquired from the GPS receiver 13 or the current position data detected with autonomous navigation to the map matching unit 120. The disk drive unit 11 reads map data from the recording medium 11a set thereto, and stores the map data in the map data storage unit 12. The map matching unit 120 carries out a matching process of reading the map data from the map data storage unit 12, and superimposing a vehicle position mark on a map at a position corresponding to the current position data received from the control unit 10. The map data on which this matching process has been performed are sent to the map display unit 110. The map display unit 110 generates drawing data on the basis of the map data sent thereto from the map matching unit 120, and sends the drawing data to the monitor 2.

A display of a current position screen is then produced (step ST12). More specifically, the monitor 2 draws a map whose center corresponds to the current position of the vehicle on the basis of the drawing data received from the map display unit 110. Thereby, the map whose center corresponds to the current position of the vehicle is displayed on the monitor 2.

Figure 3:
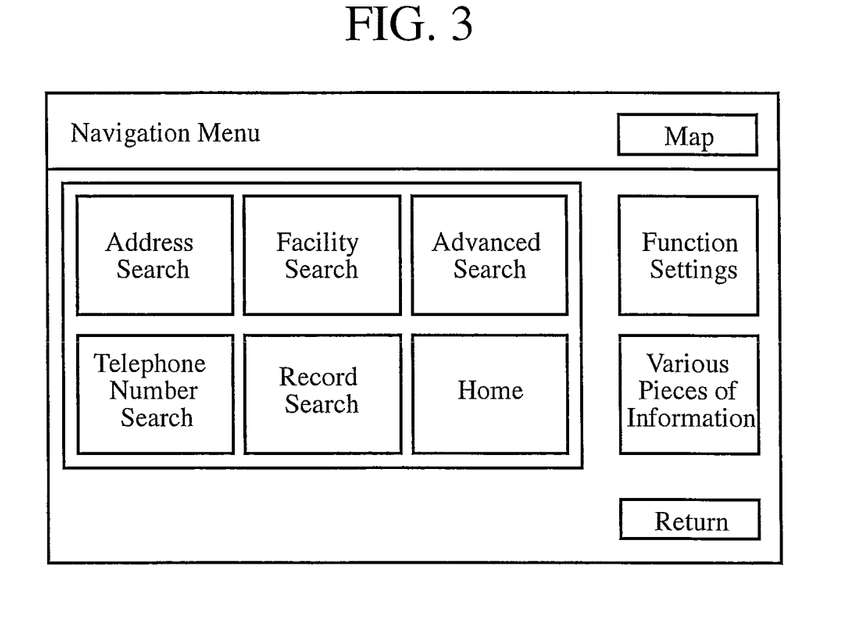
FIG. 3 is a view showing an example of a destination setup screen which is used in the navigation apparatus in accordance with Embodiment 1 of the present invention.

A setup of a destination is then performed (step ST13). More specifically, when the user performs an operation of instructing the navigation apparatus to set up a destination, the navigation apparatus displays a destination setup screen as shown in FIG. 3 on the monitor 2. In this destination setup screen, a portion enclosed by a rectangle is a button, and the user is enabled to make the navigation apparatus carry out a function allocated to the button by selecting a desired button by using the remote control 3. The same goes for each screen which will be explained hereafter. The user selects a desired button by using the remote control 3 to set up a destination (and a via-place as needed) on the map displayed on the monitor 2 by using an address search, a facility name search, a phone number search, or the like. Data showing the destination set up by the user in this step ST13 are sent to the route searching unit 130 of the navigation unit 1.

Figure 4:
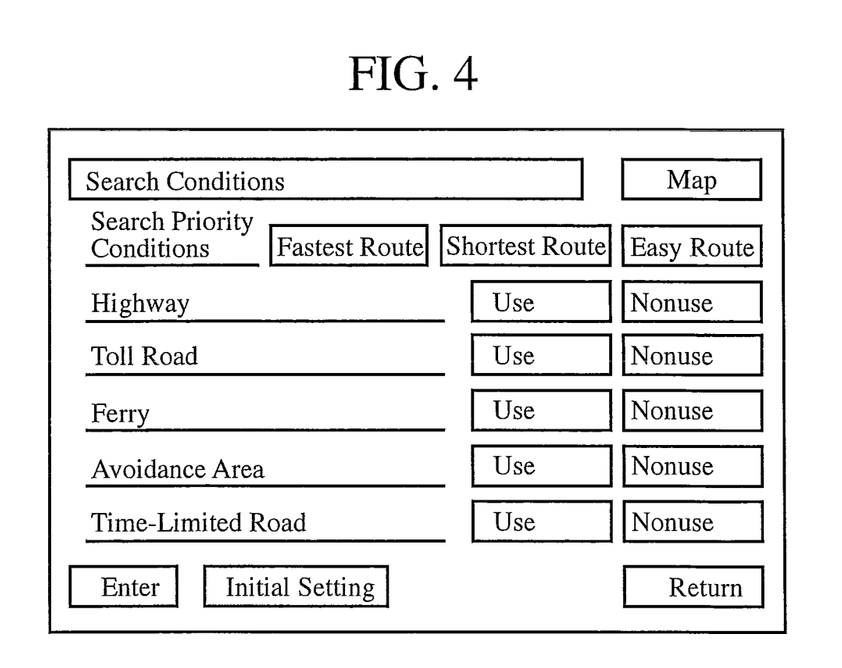
FIG. 4 is a view showing an example of a search condition setup screen which is used in the navigation apparatus in accordance with Embodiment 1 of the present invention.

A setup of search conditions is then performed (step ST14). More specifically, when a setup of a destination is completed, the navigation apparatus displays a search condition setup screen as shown in FIG. 4 on the monitor 2. The user then sets up conditions for the route search which are displayed on the monitor 2 by using the remote control 3. Concretely, the user sets up a higher-priority search condition by pushing one of a button showing "fastest root", a button showing "shortest route", and a button showing "easy root", the buttons showing higher-priority conditions, respectively. The user also sets up whether the navigation apparatus can use each of the following items: a highway, a toll road, a ferry, an avoidance route area, and a time-limited road by pushing down a "use" button or a "nonuse" button. Data showing the search conditions set up in this step ST14 are sent to the route searching unit 130 of the navigation unit 1.

A general route search is then performed (step ST15). More specifically, the route searching unit 130 searches for a route from the current position determined by either the current position data received from the GPS receiver 13 via the control unit 10 or the current position data detected with autonomous navigation to the destination set up in step ST13 according to the search conditions set up in step ST14. In a case in which it is apparent that the route searching unit can acquire an efficient route by using gates intended for car pool, and so on at the time of this search, the route searching unit can also use car pool lanes. When the route searching unit completes this route search process, the navigation apparatus displays the route to the destination on the monitor 2. After the user checks that the route is the one which the user intends to use, the user pushes down a not-shown button to instruct the navigation apparatus to start a guidance.

The navigation apparatus starts a route guidance in response to this instruction for starting a guidance (step ST16). More specifically, the route guidance unit 140 generates display data showing a guide map on the basis of the route acquired through the route search in step ST15 and sends the display data to the monitor 2, and also generates audio data showing a voice guidance message and sends the audio data to the audio speaker 4. As a result, while the guide map is displayed on the monitor 2, the guidance message is generated by voice by the audio speaker 4. Hereafter, guide maps and voice guidance messages which correspond to the environments that vary as the vehicle travels are outputted in turn.

Figure 5:
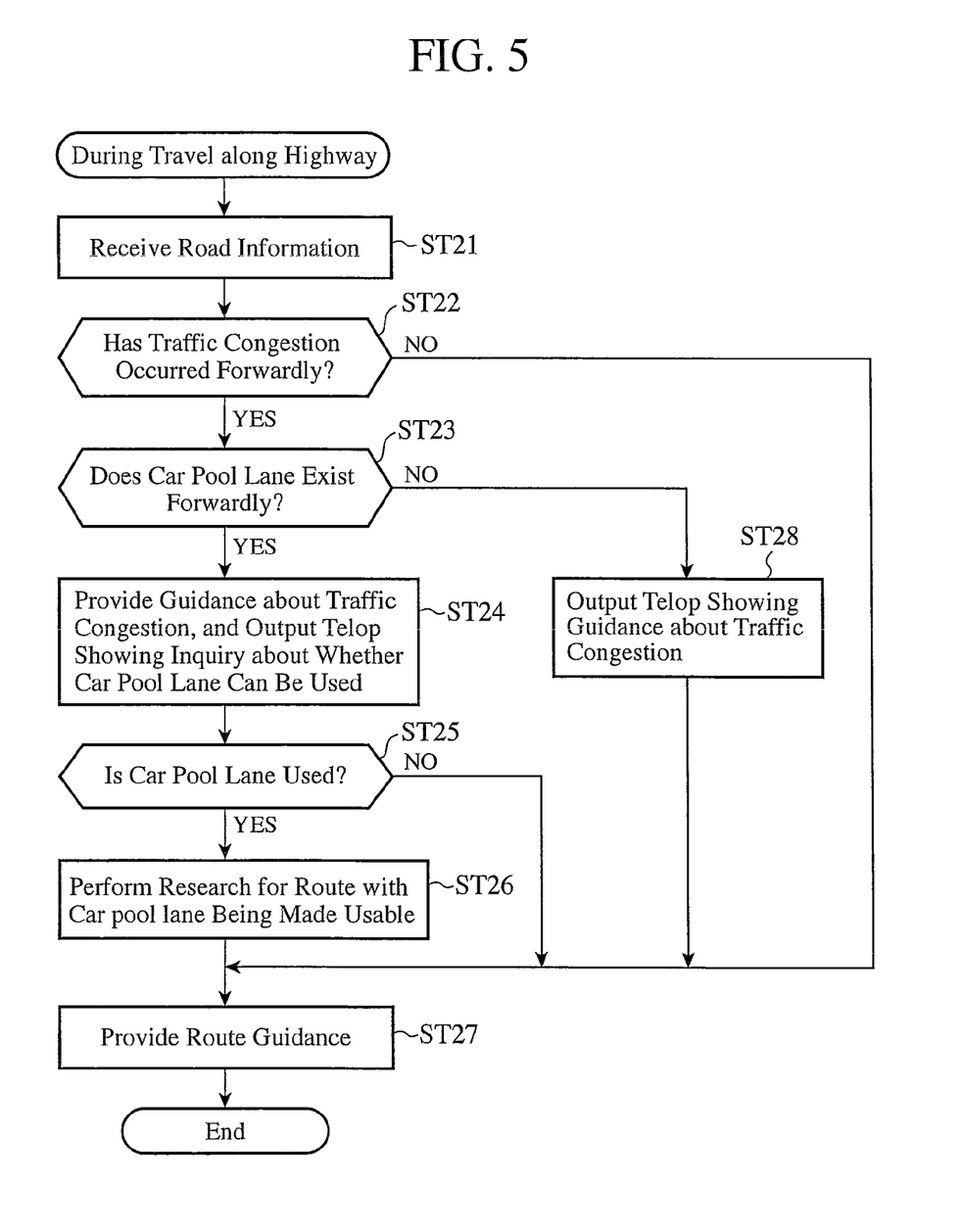
FIG. 5 is a flow chart showing a route guidance process which is performed by the navigation apparatus in accordance with Embodiment 1 of the present invention.

Next, a route guidance process which is performed as the vehicle travels along a highway will be explained with reference to a flow chart shown in FIG. 5. It is assumed that when this route guidance process is performed, the route searching unit 130 has acquired a route to the destination through the above-mentioned route search, and the route guidance unit 140 has started a route guidance.

Road information is received at an arbitrary timing in the route guidance process (step ST21). More specifically, the road information receiver 16 receives the road information signal transmitted in real time from the external road traffic data communications system, and sends the road information signal to the control unit 10 as road information. The navigation apparatus then checks to see whether a traffic congestion point exists forwardly (step ST22). More specifically, the control unit 10 checks to see whether the road information sent from the road information receiver 16 shows that a traffic congestion point exists forwardly in the traveling direction of the vehicle along the route which the route searching unit 130 has searched for. When, in this step ST22, judging that no traffic congestion point exists forwardly, the control unit advances the sequence to step ST27 and then continues the route guidance as before.

In contrast, when, in step ST22, judging that a traffic congestion point exists forwardly, the control unit then checks to see whether a car pool lane exists forwardly in the traveling direction (step ST23). More specifically, the control unit 10 checks to see whether a car pool lane is disposed forwardly in the traveling direction of the vehicle along the route which has been searched for by the route searching unit 130 on the basis of the map data read from the map data storage unit 12.

Figure 6:
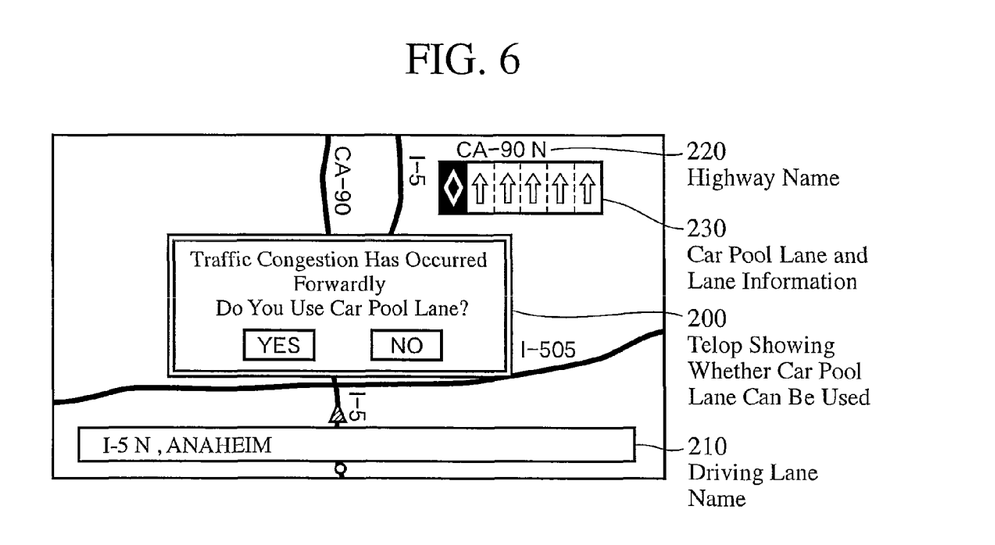
FIG. 6 is a view showing an example of a telop in a case in which a traffic congestion has occurred forwardly and a car pool lane exists in the navigation apparatus in accordance with Embodiment 1 of the present invention.

When, in this step ST23, judging that a car pool lane exists forwardly in the traveling direction of the vehicle, the control unit outputs a traffic congestion guidance and a telop showing an inquiry about whether the user can use the car pool lane (step ST24). More specifically, under the control of the control unit 10, the monitor 2 displays a telop 200, as shown in FIG. 6, including a message showing that a traffic congestion has occurred, a message showing an inquiry about whether the user can use the car pool lane, and a "YES" button and a "NO" which enable the user to specify whether the user can use the car pool lane on the map. The user pushes down the "YES" button or the "NO" button displayed on the map so as to specify whether the user can use the car pool lane on the map.

Figure 7:
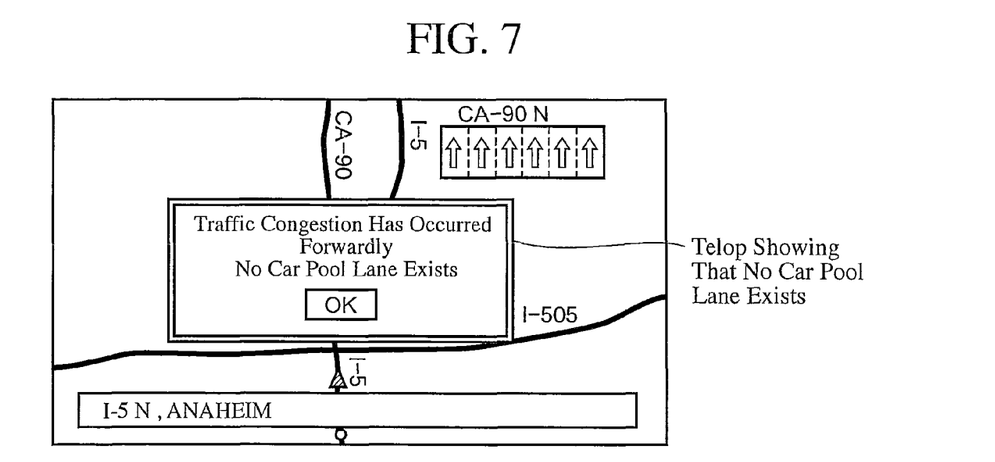
FIG. 7 is a view showing an example of a telop in a case in which a traffic congestion has occurred forwardly and no car pool lane exists in the navigation apparatus in accordance with Embodiment 1 of the present invention.
Figure 9:
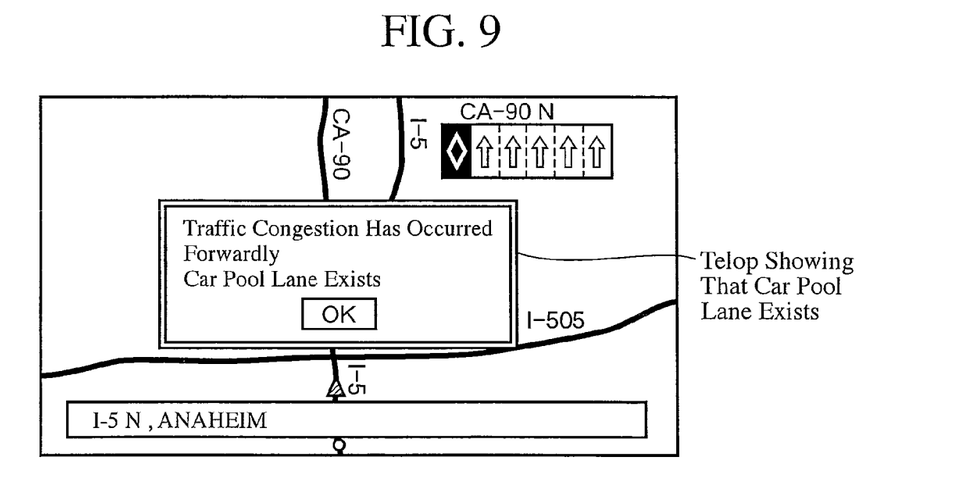
FIG. 9 is a view showing an example of a telop in a case in which a traffic congestion has occurred forwardly and a car pool lane exists in the navigation apparatus in accordance with Embodiment 2 of the present invention.

FIG. 6 shows a display example in a case in which the navigation apparatus in accordance with this embodiment is used in the U.S. where there exist car pool lanes at this time, and FIGS. 7 and 9, which will be mentioned below, also show display examples in that case. While the vehicle is traveling along a highway, the name 210 of the highway along which the vehicle is traveling is displayed regardless of the presence or absence of the route acquired through the route search. Furthermore, when a car pool lane exists forwardly in the traveling direction of the vehicle, both the name 220 of the highway in which the car pool lane is also provided and lane information 230 are displayed. The position of the car pool lane in a plurality of lanes disposed in the highway is displayed in the lane information 230 with a graphic (a rhombus) showing a car pool lane icon. In this case, each general lane is expressed as an arrow. As a result, the user can know the total number of lanes of the highway extending forwardly in the traveling direction of the vehicle, and the position of the car pool lane (e.g., the how-manieth lane from the left the car pool lane is).

The navigation apparatus then checks to see whether the user uses the car pool lane (step ST25). More specifically, the control unit 10 checks to see whether or not the "YES" button in the telop is pushed down. When, in this step ST25, judging that the user does not use the car pool lane, i.e., that which the "NO" button is pushed down, the control unit advances the sequence to step ST27 and then continues the route guidance as before.

In contrast, when, in step ST25, judging that the user uses the car pool lane, i.e., that which the "YES" button is pushed down, the control unit then performs a research for a route with car pool lanes being made usable (step ST26). More specifically, the route searching unit 130 performs a route search again with car pool lanes being made usable according to an instruction from the control unit 10. Then, the control unit advances the sequence to step ST27 and starts a route guidance along a route acquired through the research in step ST26.

When, in above-mentioned step ST23, judging that no car pool lane exists forwardly in the traveling direction of the vehicle, the control unit outputs a traffic congestion guidance telop (step ST28). More specifically, under the control of the control unit 10, the monitor 2 displays a telop, as shown in FIG. 7, including a message showing that a traffic congestion has occurred, a message showing that no car pool lane exists, and an "OK" button which urges the user to check the messages on the map. The user can check the descriptions of the messages by pushing down the "OK" button, and can examine whether to change the route. When this "OK" button is pushed down, the control unit advances the sequence to step ST27 and continues the route guidance as before.

As previously explained, the navigation apparatus in accordance with Embodiment 1 of the present invention is constructed in such a way as to, when, while the vehicle travels along the route acquired through the route search, the road information received in real time by the road information receiver 16 shows that a traffic congestion point exists forwardly in the traveling direction of the vehicle along the highway, judge whether a car pool lane is also provided in the highway, and output a message indicating the presence or absence of a car pool lane according to the judgment result. Therefore, the navigation apparatus in accordance with Embodiment 1 can present appropriate information about a car pool lane and an appropriate route to the user. As a result, the user can acquire the information about a car pool lane before the vehicle enters the car pool lane or at an earlier time than when the user will recognize the indicator of the car pool lane visually. Therefore, when the highway along which the vehicle is traveling is vacant, the user does not need to take the trouble to use a car pool lane by running the risk of performing a lane changing. As a result, the user can do safe driving more quickly while keeping calm. Furthermore, because the navigation apparatus is constructed in such a way as to make a research for a route and provide this route for the user when a traffic congestion point exists in the highway extending in the traveling direction of the vehicle and a car pool lane exists in the highway, the navigation apparatus can present a suitable route to the user.

Embodiment 2

A navigation apparatus in accordance with Embodiment 2 of the present invention is constructed in such a way as to, in a case of not performing a route search, provide a guidance about traffic congestions and a guidance about the presence or absence of a car pool lane. The structure of the navigation apparatus in accordance with this Embodiment 2 is the same as that of the navigation apparatus in accordance with Embodiment 1 shown in FIG. 1.

Figure 8:
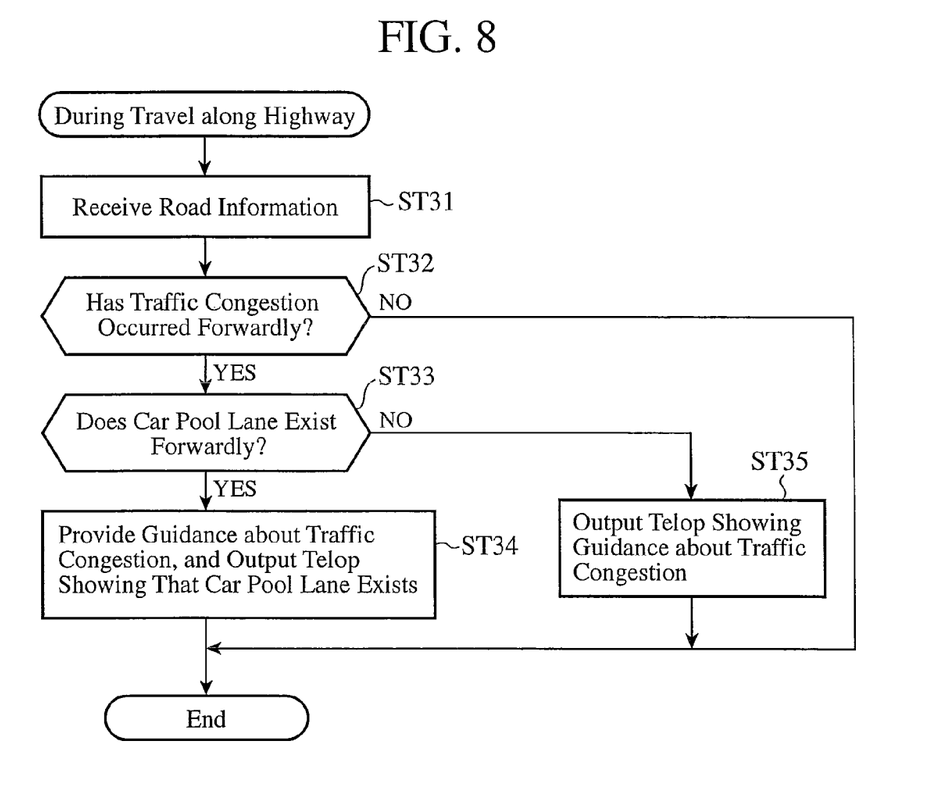
FIG. 8 is a flow chart showing a route guidance process which is performed by a navigation apparatus in accordance with Embodiment 2 of the present invention.

Next, the operation of the navigation apparatus in accordance with Embodiment 2 will be explained focusing on a guiding process which the navigation apparatus performs while the vehicle travels along a highway with reference to a flow chart shown in FIG. 8. It is assumed that when this guiding process is performed, a route searching unit 130 does not perform any route search and a route guidance unit 140 has started providing a guidance.

In the guiding process, the navigation apparatus receives road information first (step ST31). More specifically, a road information receiver 16 receives a road information signal transmitted in real time from an external road traffic data communications system, and sends the road information signal to a control unit 10 as road information. The control unit then checks to see whether a traffic congestion has occurred forwardly in the traveling direction of the vehicle (step ST32). More specifically, the control unit 10 checks to see whether the road information sent from the road information receiver 16 shows that a traffic congestion point exists forwardly in the traveling direction of the vehicle along the highway along which the vehicle is traveling. When, in this step ST32, judging that no traffic congestion has occurred forwardly in the traveling direction of the vehicle, the control unit continues the guidance as before.

In contrast, when, in above-mentioned step ST32, judging that a traffic congestion has occurred forwardly in the traveling direction of the vehicle, the control unit then checks to see whether a car pool lane exists forwardly in the traveling direction of the vehicle (step ST33). More specifically, the control unit 10 checks to see whether a car pool lane exists forwardly in the traveling direction of the vehicle along the highway along which the vehicle is traveling by checking to see map data which the control unit reads from a map data storage unit 12.

When, in this step ST33, judging that a car pool lane exists forwardly in the traveling direction of the vehicle, the control unit outputs a traffic congestion guidance and a telop showing that a car pool lane exists (step ST34). More specifically, under the control of the control unit 10, a monitor 2 displays a telop, as shown in FIG. 9, including a message showing that a traffic congestion has occurred, a message showing that a car pool lane exists, and an "OK" button which urges the user to check the messages on the map. The user can check the descriptions of the messages by pushing down the "OK" button, and can examine whether to enter the car pool lane. When this "OK" button is pushed down, the control unit continues the route guidance as before.

In contrast, when, in above-mentioned step ST33, judging that no car pool lane exists forwardly in the traveling direction of the vehicle, the control unit outputs a traffic congestion guidance and a telop showing that no car pool lane exists (step ST35). More specifically, under the control of the control unit 10, the monitor 2 displays a telop, as shown in FIG. 7, including a message showing that a traffic congestion has occurred, a message showing that no car pool lane exists, and an "OK" button which urges the user to check the messages on the map. The user can check the descriptions of the messages by pushing down the "OK" button, and can examine whether to exit the highway. When this "OK" button is pushed down, the control unit continues the route guidance as before.

As previously explained, the navigation apparatus in accordance with Embodiment 2 of the present invention is constructed in such a way as to, when the road information received in real time by the road information receiver 16 shows that a traffic congestion point exists on a highway extending in the traveling direction of the vehicle even if the vehicle is not traveling along the route acquired through the route search, judge whether a car pool lane is also provided in the highway, and output a message showing the presence or absence of a traffic congestion and the presence or absence of a car pool lane according to this judgment result. Therefore, the navigation apparatus in accordance with Embodiment 2 can present appropriate information about a car pool lane to the user. As a result, the user can acquire information about a car pool lane before the vehicle enters the car pool lane or at an earlier time than when the user will recognize the indicator of the car pool lane visually. Therefore, when a highway along which the vehicle is traveling is vacant, the user does not need to take the trouble to use a car pool lane by running the risk of performing a lane changing. As a result, the user can do safe driving more quickly while keeping calm.

INDUSTRIAL APPLICABILITY

As mentioned above, because the navigation apparatus in accordance with the present invention outputs the presence or absence of a car pool lane when a traffic congestion point exists on a highway extending in the traveling direction of the vehicle, the navigation apparatus can present appropriate information about a car pool lane to the user. Therefore, the navigation apparatus in accordance with the present invention is suitable for use as a navigation apparatus or the like which presents information about a car pool lane.

The invention claimed is:

1. A navigation apparatus comprising:
   a display;
   a processor; and
   a processor-readable memory having stored thereon instructions which, when executed by the processor, cause the processor to carry out the steps of:
   acquiring map data including car pool lane data;
   determining a current position and a traveling direction;
   generating a map of an area in a neighborhood of the determined current position on a basis of the acquired map data, and displaying the generated map on the display;
   receiving traffic information from outside said navigation apparatus;
   judging whether traffic congestion has occurred in a highway extending forwardly in the traveling direction by using the received traffic information, and judging whether a car pool lane is provided in said highway as a part thereof using the acquired map data when judging that the traffic congestion has occurred; and
   outputting, in response to a judgment that traffic congestion has occurred, a message on the displayed map indicating traffic congestion ahead and car pool lane presence or absence information showing whether or not a car pool lane is provided in said highway according to a result of the judgment.

2. The navigation apparatus according to claim 1, the steps further including:
   receiving, as an input, a destination, and
   searching for a route from the determined current position to the received destination on a basis of the acquired map data acquired,
   judging whether a traffic congestion has occurred in the searched using the traffic information, and judging whether or not a car pool lane is provided in said searched route using the acquired map data when judging that the traffic congestion has occurred.

3. The navigation apparatus according to claim 2, the steps further including:
   providing route guidance along the searched route,
   inquiring, when judging whether a car pool lane is provided in the searched route, whether or not said car pool lane can be used,
   re-searching for a route including said car pool lane when receiving an instruction to use the car pool lane in response to the inquiry, and
   providing route guidance on a basis of the re-searched route.

4. A navigation method comprising:
   acquiring, using a control unit, map data including car pool lane data;
   determining, using the control unit, a current position and a traveling direction;
   generating, using the control unit, a map of an area in a neighborhood of the determined current position on a basis of the acquired map data, and displaying the generated map;
   receiving traffic information from outside the control unit;

judging, using the control unit, whether a traffic congestion has occurred in a highway extending forwardly in the traveling direction based on the received traffic information, and judging, using the control unit, whether a car pool lane is provided in said highway as a part thereof based on the acquired map data when judging that the traffic congestion has occurred;

outputting, in response to a judgment that traffic congestion has occurred, a message on the displayed map indicating traffic congestion ahead and car pool lane presence or absence information showing whether or not a car pool lane is provided in said highway.

5. The navigation method according to claim 4, further comprising:

inputting, using a man-machine interface, a destination;

searching, using the control unit, for a route from the determined current position to the inputted destination on a basis of the acquired map data, and judging, using the control unit, whether a traffic congestion has occurred in the route searched by the route searching unit by using the traffic information, and judging whether or not a car pool lane is provided in said searched route by using the acquired map data when judging that the traffic congestion has occurred.

6. The navigation method according to claim 5, further comprising:

providing a route guidance along the searched route, inquiring, when judging that a car pool lane is provided in the searched route, whether or not said car pool lane can be used, re-searching, using the control unit, for a route including said car pool lane when receiving an instruction of using the car pool lane in response to the inquiring, and providing a route guidance on a basis of the re-searched route.

* * * * *